(12) United States Patent
Cason

(10) Patent No.: US 11,671,344 B1
(45) Date of Patent: Jun. 6, 2023

(54) ASSESSING SYSTEM EFFECTIVENESS

(71) Applicant: Wells Fargo Bank, N.A., San Francisco, CA (US)

(72) Inventor: David Cason, Worthington, OH (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 17/658,802

(22) Filed: Apr. 11, 2022

Related U.S. Application Data

(60) Division of application No. 16/565,068, filed on Sep. 9, 2019, now Pat. No. 11,323,353, which is a
(Continued)

(51) Int. Cl.
*H04L 43/50* (2022.01)
*H04L 45/00* (2022.01)
(Continued)

(52) U.S. Cl.
CPC ............ *H04L 43/50* (2013.01); *B31F 1/0003* (2013.01); *B65H 43/00* (2013.01); *G05B 19/41875* (2013.01); *G05B 23/0256* (2013.01); *G06F 11/00* (2013.01); *H04L 43/045* (2013.01); *H04L 43/062* (2013.01); *H04L 43/0817* (2013.01); *H04L 43/0841* (2013.01); *H04L 43/0852* (2013.01); *H04L 43/0894* (2013.01); *H04L 43/12* (2013.01); *H04L 45/125* (2013.01); *H04L 45/70* (2013.01); *H04L 47/10* (2013.01); *H04L 63/12* (2013.01); *H04L 63/14* (2013.01);
(Continued)

(58) Field of Classification Search
CPC ..... H04L 43/50; H04L 43/0817; H04L 43/12; H04L 45/70; B65H 43/00; B65H 2408/40; B65H 2701/1916; G05B 19/41875; G05B 23/0256
See application file for complete search history.

(56) References Cited

U.S. PATENT DOCUMENTS 7,194,661 B1    3/2007  Payson
9,397,922 B1 *  7/2016  Collins ................... H04L 43/06
(Continued)

OTHER PUBLICATIONS

Prosecution History from U.S. Appl. No. 15/672,041, now issued U.S. Pat. No. 10,411,988, dated May 1, 2019 through May 1, 2019, 10 pp.
(Continued)

*Primary Examiner* — Hashim S Bhatti
(74) *Attorney, Agent, or Firm* — Shumaker & Sieffert, P.A.

(57) ABSTRACT

In an example, a computer-implemented method includes generating test data that is configured to be identified as data of interest at one or more visibility points in a network having a plurality of network routes. The method also includes injecting the test data into each network route of the plurality of network routes at a location upstream from the one or more visibility points, and determining, for each network route through which the test data travels, whether the test data is identified at the one or more visibility points. The method also includes outputting, for each network route through which the test data travels, data that indicates whether the test data is identified at the one or more visibility points as data of interest.

20 Claims, 10 Drawing Sheets

Related U.S. Application Data continuation-in-part of application No. 15/672,041, filed on Aug. 8, 2017, now Pat. No. 10,411,988.

(60) Provisional application No. 62/440,974, filed on Dec. 30, 2016.

(51) Int. Cl.

| | | |
|---|---|---|
| *H04L 9/40* | (2022.01) | |
| *H04L 43/0852* | (2022.01) | |
| *B31F 1/00* | (2006.01) | |
| *H04L 47/10* | (2022.01) | |
| *H04L 43/062* | (2022.01) | |
| *G05B 23/02* | (2006.01) | |
| *H04L 43/0817* | (2022.01) | |
| *H04L 43/12* | (2022.01) | |
| *H04L 43/0829* | (2022.01) | |
| *H04L 43/045* | (2022.01) | |
| *B65H 43/00* | (2006.01) | |
| *H04L 43/0894* | (2022.01) | |
| *G05B 19/418* | (2006.01) | |
| *H04L 45/125* | (2022.01) | |
| *G06F 11/00* | (2006.01) | |
| *G06Q 40/00* | (2023.01) | |

(52) U.S. Cl.
CPC .. *B65H 2408/40* (2013.01); *B65H 2701/1916* (2013.01); *B65H 2701/1932* (2013.01); *G06Q 40/00* (2013.01)

(56) References Cited

U.S. PATENT DOCUMENTS

| | | |
|---|---|---|
| 10,411,988 B1 | 9/2019 | Cason |
| 10,666,775 B1 * | 5/2020 | Volpe ..................... H04L 43/50 |
| 2005/0281392 A1 | 12/2005 | Weeks et al. |
| 2010/0153055 A1 | 6/2010 | Mucha et al. |
| 2011/0188386 A1 | 8/2011 | Nicholson et al. |
| 2012/0120819 A1 | 5/2012 | Regev |
| 2013/0003565 A1 | 1/2013 | Gotwals et al. |
| 2014/0092736 A1 | 4/2014 | Baillargeon |
| 2015/0163152 A1 | 6/2015 | Li |
| 2016/0261493 A1 | 9/2016 | Li |
| 2017/0339037 A1 * | 11/2017 | Cheh ................... H04L 63/123 |

OTHER PUBLICATIONS

Prosecution History from U.S. Appl. No. 16/565,068, dated Jan. 26, 2021 through Jan. 7, 2022, 69 pp.

* cited by examiner

| LOCATION | NUMBER OF EVENTS BY HOUR | | | | | | | | | | | | | | | | | | | | | | |
|---|---|---|---|---|---|---|---|---|---|---|---|---|---|---|---|---|---|---|---|---|---|---|---|
| LOCATION A | 8 | 8 | 8 | 8 | 8 | 8 | 8 | 8 | 8 | 5 | 8 | 7 | 8 | 8 | 8 | 8 | 8 | 8 | 8 | 8 | 8 | 8 | 8 |
| LOCATION B | 6 | 6 | 6 | 6 | 6 | 6 | 6 | 6 | 6 | 4 | 4 | 4 | 5 | 6 | 6 | 5 | 6 | 6 | 6 | 6 | 6 | 6 | 6 |
| LOCATION C | 9 | 9 | 9 | 9 | 9 | 9 | 9 | 9 | 9 | 9 | 7 | 6 | 6 | 8 | 9 | 9 | 9 | 9 | 9 | 9 | 9 | 9 | 9 |

101

ASSESSING SYSTEM EFFECTIVENESS

CROSS REFERENCE

This application is a divisional of and claims the benefit of U.S. patent application Ser. No. 16/565,068, filed Sep. 9, 2019, which is a continuation-in-part of and claims the benefit of U.S. patent application Ser. No. 15/672,041, filed Aug. 8, 2017, now U.S. Pat. No. 10,411,988, which claims the benefit of U.S. Provisional Application Ser. No. 62/440,974, filed Dec. 30, 2016, the entire content of all of which are incorporated herein by reference.

TECHNICAL FIELD

The disclosure relates to assessing the effectiveness of a service path, such as a service path of physical processes or a service path in a computing environment or networked computing environment.

BACKGROUND

A service path is a system for performing a series of tasks or an overall process. A service path may be implemented using a system of electronic, mechanical, or other devices, or service providers that operate on data, physical objects, or other items to perform a function, achieve a result, generate data, and/or generate or transform a physical object. A networked computing environment is an example of a service path that may include a number of interdependent computing devices, servers, and processes that transmit and receive data via a network. In some instances, and in a service path implemented using a networked computing environment, one or more network security tools may be deployed to monitor network data and identify data that that may be malicious. The network security tools may be deployed at a number of locations throughout the network and may be tasked with processing a relatively large amount of data. For example, an enterprise computing environment may include hundreds or thousands of computing devices, servers, and processes that transmit or receive network data via a large number of network routes. In certain instances, it may be difficult to determine whether the security tools are identifying and/or processing the data.

SUMMARY

In general, the techniques of this disclosure relate to assessing, measuring, and/or adjusting system effectiveness. For example, a service path implemented on a networked computing environment may have a plurality of network routes and one or more visibility points that monitor and/or process data traffic on those routes, e.g., such as one or more data security appliances. According to aspects of this disclosure, a computing device in such a service path may generate test data that is configured to be identified as data of interest at the visibility points of the network (or visibility points in the service path). The computing device may inject the test data into each network route at a location upstream from the one or more visibility points, and verify, for each network route through which the test data travels, that the test data is identified at the one or more visibility points. In examples of networks having more than one visibility point, the computing device may also verify that each of the visibility points identifies the data, e.g., by comparing data identified at the visibility points. The computing system may repeat the testing at regular intervals. In this way, the techniques may provide a comprehensive measurement of system effectiveness by testing each route and each visibility point.

In other examples, a service path implemented on a networked computing environment might also do more than merely observe test data and verify that the test data is identified at a visibility point. For instance, in some examples, a visibility point or other component of such a network may block and/or shape the data to address, remediate, or control aspects of the data or the operation of the service path. In one such example, test data might be injected into a network route, and a first downstream visibility point might verify that the test data has traversed the network. That first visibility point may also, however, block the data. Where the data is blocked by the first visibility point, a second visibility point, further downstream, may then verify that the test data did not arrive at the second visibility point. In some examples, such as in a mechanical process being performed by a service path, one or more visibility points may cause the service path to be stopped if a test event or test data is not detected as expected, or if the data has not been appropriately blocked. In such an example, a repair and resume protocol might be initiated to address any service path problems arising from the failure to accurately detect the test event or test data.

In another example, test data might be injected into a network route, and a first downstream visibility point might shape, reshape, and/or modify the test data (e.g., remove a malicious file, change an erroneous packet header, reroute traffic, control flow of traffic). A second visibility point, further downstream in such an example, may verify that the test data arrived at the second visibility point in the appropriate modified or shaped form. Multiple visibility points may each perform a reshaping and/or blocking operation, and later downstream visibility points may verify that the reshaping and/or blocking operations were performed successfully and in sequence.

In another example, this disclosure describes a method comprising generating, by the computing system, test data that is configured to be identified as data of interest at one or more of a plurality of visibility points in a service path having a plurality of network routes; injecting, by the computing system, the test data into a first network route of the plurality of network routes at a location upstream from a first visibility point of the plurality of visibility points, wherein the first visibility point is located along the first network route; determining, by identifying the test data at the first visibility point, whether the test data has traveled along the first network route; modifying the test data by the first visibility point to generate modified test data; injecting, by the first visibility point, the modified test data into a second network route of the plurality of network routes at a location upstream from a second visibility point of the plurality of visibility points, wherein the second visibility point is located along the second network route; determining, by identifying the modified test data at the second visibility point, whether the modified test data has traveled along the second network route; receiving, by the computing system, assessment data indicating whether the test data traveled along the first network route and the modified test data traveled along the second network route; and assessing, by the computing system and based on the assessment data, the effectiveness of the network.

In another example, this disclosure describes a method comprising generating, by a computing system, test data that is configured to be identified as data of interest at one or more visibility points in a service path having a plurality of network routes, each of the plurality of network routes including a proxy that maintains a proxy log identifying data processed by the proxy; injecting, by the computing system, the test data into each network route of the plurality of network routes at a location upstream from the one or more visibility points; receiving, by the computing system, data from the one or more visibility points; determining, for each network route through which the test data travels and based on the data received from the one or more visibility points, whether the test data is identified at the one or more visibility points; outputting, for each network route through which the test data travels, data that indicates whether the test data is identified at the one or more visibility points as data of interest; comparing, by the computing system, the data that indicates whether the test data is identified to data derived from the proxy log; and outputting, by the computing system, data representative of the comparison.

The details of one or more examples of the disclosure are set forth in the accompanying drawings and the description below. Other features, objects, and advantages of the disclosure will be apparent from the description and drawings, and from the claims.

DETAILED DESCRIPTION

Traditional attempts to understand the health of a service path may be limited to outside-perspective monitoring concepts. For example, for a service path that is implemented on a computer network, outside-perspective monitoring concepts may include determining whether system components on the network are powered and whether those system components are operating. However, such monitoring concepts might not provide a reliable measure of actual system effectiveness, e.g., how well a particular system is doing its job. With respect to a data security appliance in a network system, as an example, monitoring whether the data security appliance is powered and operating does not provide a reliable indication of how well the data security appliance is monitoring network traffic and identifying unauthorized or malicious data.

According to aspects of this disclosure, innocuous test events or test data may be inserted into a service path to cause the service path to perform certain actions, and the effectiveness of the service path may be evaluated based on the extent to which the service path performs the desired actions. For example, a computing device may create innocuous events of interest and inject the events of interest into each possible network route of a networked environment. The computing device may then verify that the events of interest are recognized and processed by visibility points in the service path, which may include upstream security tools. The computing device may repeat the process of creating, injecting, and verifying test data in order to provide a complete assessment of how well system components are operating over a given time period (e.g., over an entire day).

Figure 1:
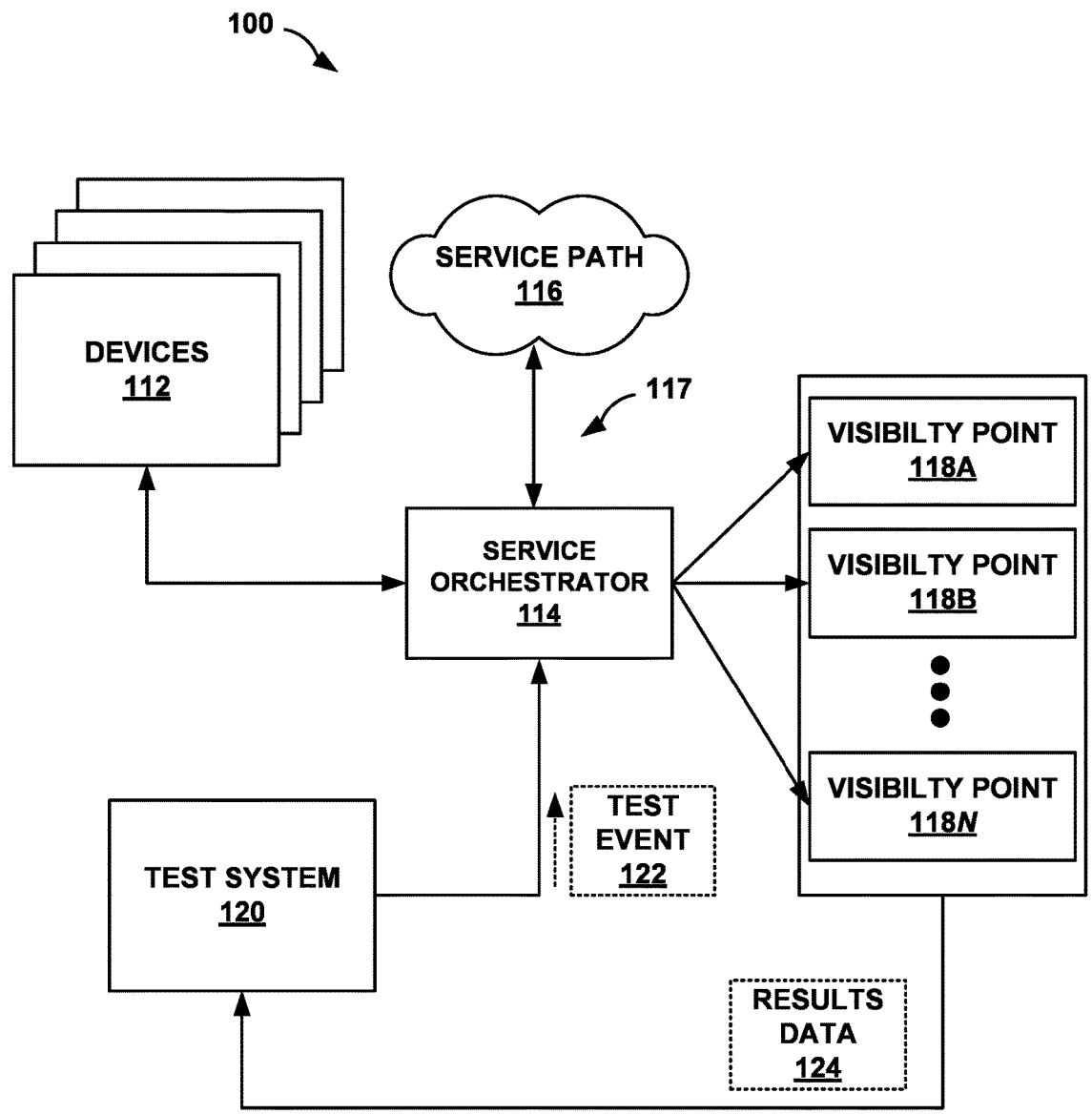
FIG. 1 is a block diagram illustrating an example system for verifying the effectiveness of a service path in accordance with one or more aspects of the present disclosure.

FIG. 1 is a block diagram illustrating an example system for verifying the effectiveness of a service path in accordance with one or more aspects of the present disclosure. In the example of FIG. 1, system 100 includes service path 116, which is implemented through a number of tasks or processes orchestrated by service orchestrator 114. The tasks and/or processes performed by service path 116 may be performed pursuant to an overall objective of the service path 116. In FIG. 1, a set of devices 112 are accessible to and/or included within the service path 116 and are deployed by service orchestrator 114 to further the operation of service path 116. Devices 112 may therefore be used in performing or carrying out aspects of service path 116.

System 100, as implemented in FIG. 1, includes visibility points 118A through 118N (collectively, "visibility points 118") and test system 120. Test system 120 is, in some examples, used to trigger test events, generate test data, and/or otherwise provide an action to be performed by service path 114. Test system 120 may also receive results or assessment data 124 from one or more of visibility points 118. Based on the results or assessment data 124, test system 120 may determine or assess the effectiveness of service path 116.

In some examples, system 100 may represent a system that implements a service path that performs data processing operations, such as a network of computing devices or compute nodes. In other examples, system 100 may represent a system that implements a service path that performs physical operations, such as assembling a physical object or performing a process involving creation, management, sorting, or otherwise handling physical items. In some examples, a service path that performs physical operations may include a manufacturing line, assembly line, or a service path that performs a series of physical operations. In such examples, one or more devices 112 may be employed to perform various tasks associated with the service path, as orchestrated by service path orchestrator 114.

In accordance with one or more aspects of the present disclosure, service path 116 causes service orchestrator 114 to perform operations pursuant to an objective of service path 116. To cause service orchestrator 114 to perform operations pursuant to the objective of service path 116, service orchestrator 114 may be configured or receive input from a user or administrator, or may be otherwise designed or configured appropriately.

In implementing service path 116, service orchestrator 114 may cause one or more devices 112 to perform operations. In some examples, one or more of devices 112 generate data, perform a computing or network operation, generate a physical object, and/or perform a physical task. Each such device 112 outputs information or signals to service orchestrator 114. Such information or signals may include data or control signals. Responsive to such information and/or control signals, service orchestrator 114 causes other devices 112 to perform operations, again generating data, performing a computing or network operation, generating a physical object, and/or performing a physical task. Service orchestrator 114 may continue to orchestrate operations performed by device 112 pursuant to an overall objective of service path 116.

Test system 120 may test service path 116 during operation of service path 116. For instance, in one example, test system 120 generates data associated with test event 122 and outputs test event 122 (or data representing test event 122) to service orchestrator 114. Service orchestrator 114 receives and/or interprets test event 122 and based on test event 122, causes one or more of devices 112 to perform operations. One or more of visibility points 118 have visibility into operations performed by devices 112, service orchestrator 114, and/or service path 116, and one or more of visibility points 118 monitor such operations. One or more of visibility points 118 evaluate operations performed by devices 112, service orchestrator 114, and/or service path 116 in response to test event 122. One or more of visibility points 118 output results data 124, reporting information derived from the evaluation. Test system 120 analyzes results data 124 to determine whether devices 112, service orchestrator 114, and service path 116 properly responded to test event 122. Through such analysis of data received from visibility points 118, test system 120 effectively tests service path 116.

In some examples, test system 120 may also test one or more additional service paths (not shown) that may be kept in reserve for failover or backup purposes. For instance, in one example, system 100 may be implemented by two parallel sets of devices, where each set includes devices 112, service orchestrator 114, and service path 116. In such an example, one set of devices may be used as a production system, and the other set may be used as a hot backup system that is employed as needed when problems or outages occur in the production system. To ensure that the backup system is reliably available, however, test system 120 may also periodically, occasionally, and/or continually test the backup system using visibility points 118 or a parallel set of visibility points 118 associated with the backup system. Testing both the production and backup systems may provide assurances not just about whether the production system is operating properly, but also about whether the backup system will be ready to perform appropriately in a failover scenario.

Figure 2A:
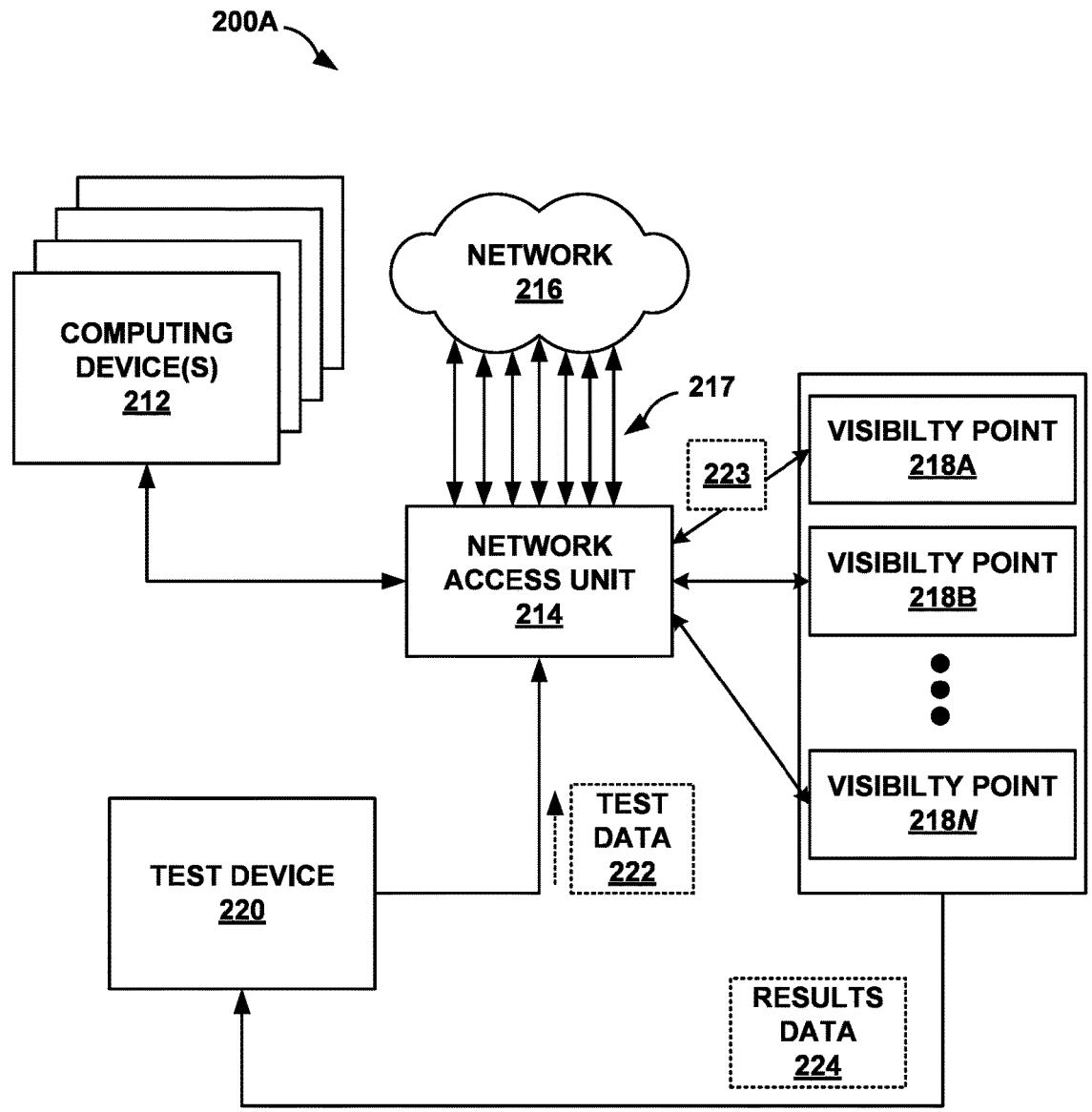
FIG. 2A is a block diagram illustrating an example computing system for verifying, evaluating, and/or assessing system effectiveness in accordance with the techniques of this disclosure.

FIG. 2A is a block diagram illustrating an example computing system 200A for verifying, evaluating, and/or assessing system effectiveness in accordance with the techniques of this disclosure. The example computing system 200A of FIG. 2A includes computing devices 212 that are connected to a network access unit 214 that provides access to network 216 via a plurality of network routes 217. System 200A also includes visibility points 218A-218N (collectively, visibility points 218) and a test device 220 that is configured to generate and transmit test data 222.

The architecture of system 200A illustrated in FIG. 2A is shown as an example and system 200A is not limited to the architecture shown. For example, system 200A illustrated in FIG. 2A shows a plurality of visibility points 218 connected to network access unit 214. In other examples, as described below, there may be one or more visibility points 218 distributed throughout system 200A. Other modifications to system 200A, more or less significant than changing the number of visibility points 218, are within the scope of the present disclosure.

Computing devices 212 may provide processing resources or store data to support a wide variety of applications. The functionality of computing devices 212 may be implemented in hardware or in a combination of software and hardware, where requisite hardware may be provided to store and execute software instructions. For example, computing devices 212 may include any of a wide range of user devices, including laptop or desktop computers, tablet computers, so-called "smart" phones, "smart" pads, or other personal digital appliances. Computing devices 212 may additionally include any combination of application servers, web servers, computing servers, database servers, file servers, media servers, communications servers, or another other computing device capable of sharing processing resources and/or data with other computing devices.

In some instances, computing devices 212 may form all or a portion of an enterprise computing environment that is configured to support a wide variety of services associated with a business. In an example for purposes of illustration, computing devices 212 may support services associated with a financial institution that offers different banking products, such as checking accounts, savings accounts, and credit accounts; and different lending products, such as home loans, car loans, business loans, student loans, and the like.

Network access unit 214 may provide computing devices 212 access to network 216 via network routes 217. For example, network access unit 214 may include a variety of routers, switches, or other components for routing data from computing devices 212 to an external network such as the Internet. Network access unit 214 may include one or more firewalls, sever infrastructure, or other components and may be positioned on a perimeter of network 216 acting as a gateway between computing devices 212 and network 216. As described in greater detail with respect to the example of FIG. 2, network routes 217 may be managed using network proxies that are stand-alone devices or incorporated in network access unit 214.

Network 216 may comprise a private network that includes, for example, a private network associated with a financial institution, or may comprise a public network, such as the Internet. Although illustrated as a single entity, network 216 may comprise a combination of networks. Computing devices 212 may be connected to network 216 via wired and/or wireless links. The links may form part of a packet-based network, such as a local area network, a wide-area network, or a global network such as the Internet. The links may include intermediate routers, switches, base stations, or any other equipment that may be useful to facilitate communication between devices connected to network 216.

Visibility points 218 may include a wide variety of devices and/or services that have access to data of system 200A. That is, as described herein, a visibility point may generally refer to any device or service that has access to or interacts with data being transmitted or received within a system or network. In the context of network security, visibility points 218 may comprise a variety of data security appliances that are configured to inspect data for cyber threats such as malware or other unauthorized or malicious data. In other examples, visibility points 218 may include other devices incorporated in a system for carrying out a particular function, such as computing devices included in a high frequency trading platform.

Test device 220 may include a variety of devices for processing and/or manipulating data. For example, in general, the functionality of test device 220 may be implemented in a device that includes one or more processing units, such as one or more microprocessors. The functionality of test device 220 may be implemented in hardware or in a combination of software and hardware, where requisite hardware may be provided to store and execute software instructions. While shown as a single computing device in the example of FIG. 2A for purposes of illustration, in some examples, test device 220 may include a distributed network of computing devices including one or more workstations, servers, and/or other computing devices.

Test data 222 may include any data that is identifiable as data of interest by visibility points 218. Test data 222 may be referred to as "innocuous data," in that test data 222 is not intended to carry out any function other than testing how effectively data is identified and/or processed by components of system 200A. With respect to network security, as an example, test device 220 may generate test data 222 to be identified by visibility points 218 as being unauthorized or malicious without actually containing data that is malicious to components of system 200A. For example, visibility points 218 may be configured with one or more rules that define which data to process, and test data 222 may be based on such rules.

According to aspects of this disclosure, test device 220 may generate test data 222 to measure the effectiveness of visibility points 218, e.g., to determine whether visibility points 218 are able to identify and process test data 222. The ability to identify and process test data 222 may indicate that visibility points 218 are also able to effectively identify and process other system data, such as data being received from and/or transmitted to network 216 by computing devices 212. That is, the ability to identify and process the innocuous test data 222 may indicate that visibility points 218 are also able to effectively identify and process potentially unauthorized or malicious data.

The specific configuration of test data 222 may depend on the particular system effectiveness being tested. For example, test device 220 may generate test data 222 to include a particular type of data that is meaningful to the test. In an example for purposes of illustration, test device 220 may generate test data 222 to include an indication of a time at which test data 222 is generated or injected into network routes 217. In other examples, test device 220 may generate test data 222 to include other types of data such as data that indicates a test target, data that includes strings of symbols, data that includes a hash or encryption pattern, emails and email attachments, or the like.

Visibility points 218 may be configured to identify the particular type of test data 222 generated by test device 220. For example, a system administrator may configure visibility points 218 with one or more rules for identifying test data 222. Visibility points 218 may apply the rules to all data being transmitted on network routes 217.

After visibility points 218 have been configured to identify test data 222, test device 220 may transmit test data 222 to pass through each of network routes 217 (which may be referred to as "injecting" test data 222) at a location upstream from visibility points 218. In the example shown in FIG. 2A, test device 220 injects test data upstream from network access unit 214, which is generally responsible for controlling data traffic to and from network 216 and therefore visible to each of visibility points 218. In other examples, test device 220 may inject test data 222 at other locations in system 200A, provided visibility points 218 are still able to access test data 222.

According to aspects of this disclosure, test device 220 may determine, for each of network route 217 through which test data 222 travels, whether visibility points 218 have identified and/or processed test data 222. For example, test device 220 (or another management or reporting tool) may obtain, from each of visibility points 218, results data 224 indicating that visibility points 218 have identified test data 222. In some examples, test device 220 may also obtain other data from visibility points 218, such as data indicating a time at which test data 222 is processed, the manner in which visibility points 218 identified test data 222 (e.g., how visibility points 218 categorized test data 222), and/or the manner in which visibility points 218 process test data 222 (e.g., what processes visibility points 218 applied to test data 222). Test device 220 may obtain the data from visibility points 218 and determine whether visibility points 218 have identified and/or processed test data 222 based on the received data.

Test device 220 may also output data indicating whether visibility points 218 have identified and/or processed test data 222. For example, test device 220 may output data indicating that one or more visibility points 218 did not identify test data 222 or improperly categorized or processed test data 222. Again, while illustrated as a single component in the example of FIG. 2A, it should be understood that test device 220 may comprise more than one device or service. For example, test device 220 may include devices or services for generating test data 222 and injecting test data 222 that are separate from devices or services that are responsible for obtaining results data 224, determining whether visibility points 218 have identified and/or processed test data 222, and/or outputting data that indicates whether visibility points 218 have identified and/or processed test data 222.

According to aspects of this disclosure, test device 220 may repeat the testing (e.g., generating test data 222, injecting test data 222, and determining whether visibility points 218 have identified and/or processed test data 222) at regular or other intervals. In an example for purposes of illustration, test device 220 may repeat testing at every hour on the half hour. In this example, visibility points 218 may identify test data 222 in a single hour block with some time to process test data 222 late, but at regular enough intervals to identify deficiencies. In other examples, test device 220 may use other intervals between tests, such as every 10 minutes, every half hour, or the like. In this way, the techniques may provide a comprehensive indication of whether and how well visibility points 218 are identifying and/or processing test data 222 over a given time period.

In examples in which system 200A includes multiple visibility points 218, test device 220 may additionally or alternatively compare test results between visibility points 218. For example, test device 220 may obtain results data from visibility point 218A indicating that visibility point 218A processed test data 222 at a particular time. Test device 220 may obtain results data from visibility point 218B indicating that visibility point 218B did not identify or process test data 222 at the particular time. In this example, test device 220 may determine that visibility point 218B failed to properly identify test data 222 at the particular time.

In this way, the techniques may be used to measure system effectiveness in a variety of ways. For example, test device 220 may determine that visibility points 218 are actually processing data for all network routes 217, as well as the manner in which visibility points 218 are processing the data.

In some examples, one or more visibility points 218 within system 200A may do more than merely observe test data 222 and verify that test data 222 is identified at each respective visibility point 218. For instance, in some examples, one or more visibility points 218 may block, shape and/or reshape test data 222 to address, remediate, or control aspects of the test data 222 and/or operation of system 200A. In such examples, one or more visibility points 218 may be performing more of an active or preventative task, rather than merely observing operations.

In FIG. 2A, for example, test device 220 may initially inject test data 222 into a network route, and visibility point 218A may later verify that test data 222 has traversed appropriate network routes 217 in arriving at visibility point 218A. Visibility point 218A may also, however, block the data. In such an example, a second visibility point further downstream, such as visibility point 218B, may then verify that the test data did not arrive at the second visibility point.

In another example, test device 220 may inject test data 222 into a network route, and again, visibility point 218A may verify that test data 222 is identified test data 222 traversed appropriate network routes 217 in arriving at visibility point 218A. Rather than blocking test data 222, visibility point 218A may shape and/or modify the test data (e.g., remove a malicious file, change an erroneous packet header), and thereby generate modified test data 223. Visibility point 218A may reinsert modified test data 223 back into one or more network routes 217. A later visibility point such as visibility point 218B, further downstream from visibility point 218A, may verify that the modified test data 223 arrived at the visibility point 218B in the appropriate modified or shaped form.

Figure 2B:
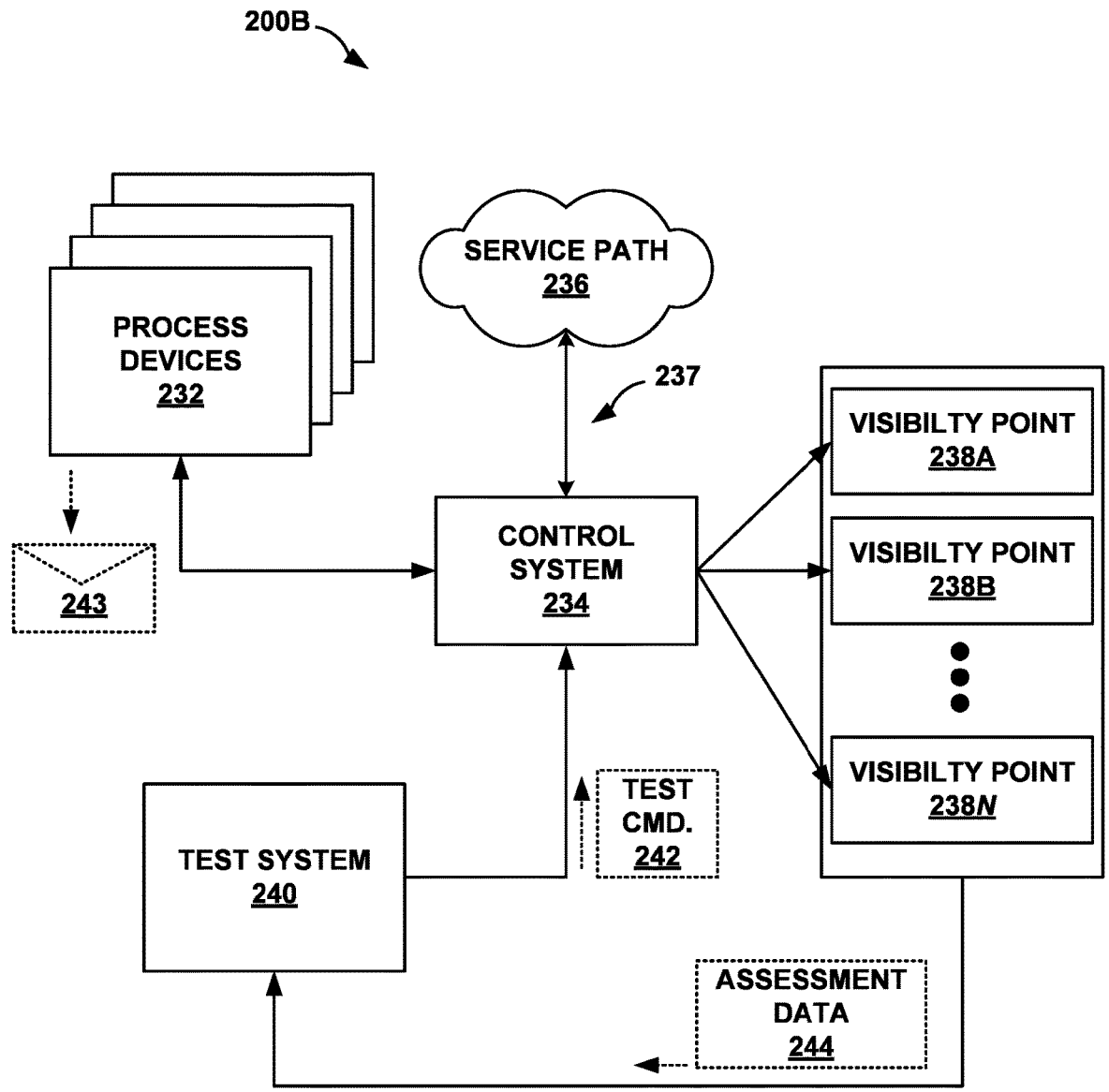
FIG. 2B is a block diagram illustrating an example system for verifying, evaluating, and/or assessing system effectiveness in accordance with one or more aspects of the present disclosure.

FIG. 2B is a block diagram illustrating an example system 200B for verifying, evaluating, and/or assessing system effectiveness in accordance with one or more aspects of the present disclosure. System 200B of FIG. 2B has some parallels to system 200A of FIG. 2A, but system 200B illustrates a system that implements a service path that involves at least some physical operations, and in general, more physical operations than system 200A of FIG. 2A. System 200B includes one or more process devices 232 that are connected to or accessible by control system 234. Each of process devices 232 may be a device for performing a physical process. One or more of process devices 232 may also or alternatively be a storage device and/or compute node configured for use by physical service path 236 and control system 234. Physical service path 236 operates by causing control system 234 to control process devices 232 to perform operations. In some examples, physical service path 236 may be integrated into, or may be the same as control system 234. In other examples, physical service path 236 may communicate with control system 234 over connection 237, which may be a network connection or any other appropriate connection.

System 200B includes test system 240 and one or more visibility points 238 (e.g., visibility point 238A through 238N) within or along a service path. Test system 240 may be configured to insert one or more test commands 242 into physical service path 236, such as via control system 234. As a result of such test commands 242, one or more test items 243 may be generated by process devices 232. Each of visibility points 238 may monitor operations of system 200B, including the progress of test items 243. One or more of visibility points 238 may generate assessment data 244, and output assessment data 244 to test system 240. Test system 240 may evaluate assessment data 244 to assess effectiveness of system 200B.

System 200B may, in one example, be a system for generating a mass mailing, such as a physical process for accurately assembling bank statements into envelopes and ensuring that each such bank statement is addressed and mailed to the correct person. In such an example, one or more of process devices 232 may be systems for printing bank statements, placing a folded bank statements into an envelope, sealing envelopes, and collating the envelopes for mailing.

In such an example, process devices 232 may be deployed for the purpose of implementing a mass mailing service path. For instance, in an example that can be described in connection with FIG. 2B, physical service path 236 communicates with control system 234 to imitate assembly of a mass mailing of bank statements. Control system 234 selects and/or configures one or more process devices 232 for use in a service path that performs tasks consistent with a mass mailing of bank statements. Control system 234 accesses data stored in one or more process devices 232, such as data about bank customers and financial account information. Control system 234 causes one or more process devices 232 to use the accessed data to generate bank statement data and print the bank statements. Control system 234 causes one or more process devices 232 to fold the printed bank statements and insert the folded bank statements into envelopes. Control system 234 causes one or more process devices 232 to sort and/or collate the envelopes containing the bank statements to prepare the envelopes for mailing.

Test system 240 may test effectiveness of physical service path 236. For instance, in the example of FIG. 2B, test system 240 outputs test command 242 to control system 234. Control system 234 interprets test command 242 and causes one or more of process devices 232 to generate bank statement test data, print the test data as a statement, fold the printed statement, and insert the statement into an envelope, thereby producing test item 243. In some examples, test system 240 may output multiple test commands 242 to control system 234, and control system 234 may cause multiple test items 243 to be generated.

One or more of visibility points 238 evaluates one or more steps associated with producing each of test items 243. For instance, one or more visibility points 238 may verify that an envelope was generated in response to each of test commands 242. One or more of visibility points 238 may evaluate the address printed on an envelope corresponding to each of test items 243. One or more of visibility points 238 may evaluate the contents of each envelope corresponding to each of test items 243. In some examples, evaluating each of test items 243 is an automated process. In other examples, however, one or more of the steps associated with evaluating each of test items 243 may be performed by, or supervised by, a user or an administrator.

One or more of visibility points 238 output assessment data 244 reflecting operations performed by control system 234 and/or process devices 232 in generating test items 243. Test system 240 interprets assessment data 244 and assesses the effectiveness of system 200B.

In some examples, assessment data 244 may provide an indication of timeliness associated with one or more processes performed by physical service path 236 and/or processes devices 232. Test system 240 may interpret such information and include the interpretation in assessing the effectiveness of system 200B. For instance, each of process devices 232 may be evaluated as to how the time spent by processes performed by each of process devices 232 impacted timeliness. Such information may enable tuning of each of process devices 232, identifying time-critical processes, and identifying poorly functioning process devices 232.

In some examples, test system 240 may evaluate steps associated with producing test items 243 by causing test items 243 to be generated at the start and end of the service path. In some service paths, if test items 243 are properly processed at the start and end of the service path, that may sufficiently indicate that the service path is operating properly. In such an example, test system 240 may cause a first test item 243 to be generated at the beginning of the service path (e.g., as the first envelope containing the first bank statement). Test system 240 may also cause a second test item 243 to be generated at the end of the service path (e.g., as the final envelope containing the final bank statement). Test system 240 may compare assessment data 244 received from visibility points 238 to ensure that the data associated with the last bank statement is properly printed on the statement in the last envelope. If that last statement is correctly printed and placed in the proper envelope, that may be a sufficient indication that the statements were consistently and properly printed along the entire line. In other examples, however, additional checkpoints between the first bank statement and the last statement may be used.

The form of assessment data 244 may differ in some implementations, depending on the type of service path. For instance, in the example of FIG. 2B, assessment data 244 may be an image of test items 243 (e.g. a picture of a clear or transparent envelope with the statement folded within the envelope). Alternatively, or in addition, assessment data 244 in the example of FIG. 2B may be the actual test item 243 or test items 243. In other implementations, assessment data 244 may take other forms.

Further, in some examples, test items 243 may be treated as an actual result of physical service path 236. For instance, in the example described in connection with FIG. 2B, one or more of process devices 232 generating test items 243 may generate a valid mailing address, so that if each of test items 243 are actually mailed, such test items 243 would be mailed to an address associated with a user or administrator or an organization. Such a user or organization may, in some examples, have responsibility for verifying or reporting the receipt of one or more of test items 243, thereby testing and/or verifying the final (or one of the final) steps of physical service path 236 illustrated in FIG. 2B.

Figure 3A:
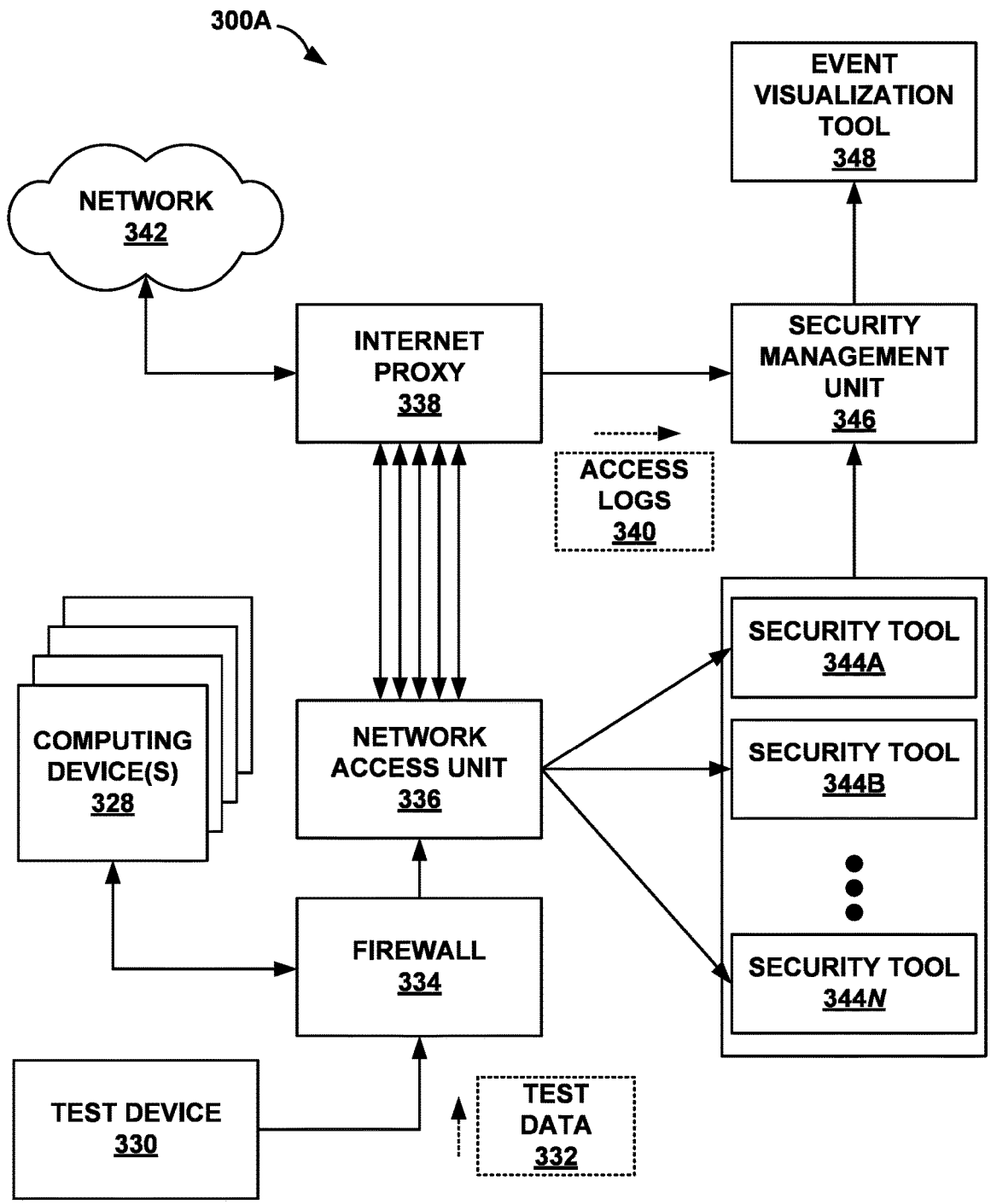
FIG. 3A is a block diagram illustrating an example networked computing system having a test device that is configured to verify system effectiveness in accordance with the techniques of this disclosure.

FIG. 3A is a block diagram illustrating an example networked computing system having a test device that is configured to verify system effectiveness in accordance with the techniques of this disclosure. The example of FIG. 3A includes computing devices 328, test device 330, test data 332, firewall 334, network access unit 336, internet proxy 338 that generates access logs 340, and network 342. FIG. 3A also includes security tools 344A-344N (collectively, security tools 344), a security management unit 346, and an event visualization tool 348. The architecture of the system illustrated in FIG. 3A is shown for exemplary purposes only, and other examples may have additional, fewer, or alternative components than those shown in FIG. 3A.

The example of FIG. 3A generally illustrates the techniques in the context of testing the effectiveness of network security devices or services. In some examples, certain components of FIG. 3A may be configured similarly or the same as components illustrated in the example of FIG. 2A. For example, computing devices 328 may generally correspond to computing devices 212, test device 330 may generally correspond to test device 220, test data 332 may generally correspond to test data 222, network access unit 336 may generally correspond to network access unit 214, and network 342 may generally correspond to network 216.

Firewall 334 may include devices and/or services that monitor and control incoming and outgoing network traffic based on predetermined security rules. Firewall 334 may be located at the perimeter of a network and be responsible for processing all data transmitted to computing devices 328 from network 342. Internet proxy 338 may include one or more proxy servers for managing connections to network 342. In some examples, internet proxy 338 may include individual Internet Protocol (IP) proxy routes to network 342. In other examples, internet proxy 338 may include load-balanced Virtual IP (VIP) proxy routes to network 342. Access logs 340 may provide an indication of data traffic managed by internet proxy 338.

Security tools 344 may be responsible for identifying and processing network data, such as data received by computing devices 328 from network 342, such as the Internet. Example security tools 344 include FireEye Central Management System and Dynamic Threat Intelligence products developed by FireEye Incorporated, TippingPoint Intrusion Prevention System developed by Trend Micro Corporation, Security Analytics developed by RSA Corporation, or a wide variety of other proprietary or publicly available devices or services for providing cybersecurity.

Security management unit 346 may perform security analytics or intelligence as a part of a security information and event management (SIEM) platform. Security management unit 346 may receive data from security tools 344, access logs 340 from internet proxy 338, or other sources. As an example, security management unit 346 may include ArcSight Enterprise Security Manager software developed by Hewlett-Packard company.

According to aspects of this disclosure, test device 330 may generate test data 332 and inject test data 332 into the system shown in FIG. 3A. In some examples, test device 330 may call a wget-style or curl-style command to fetch test data 332. In other examples, test device 330 may export a particular proxy or VIP and then use a wget command to fetch test data 332. In an example for purposes of illustration, to test VIP routes associated with a network operations center (NOC) that includes internet proxy 338, test device 330 may execute the following commands at a Linux command line:

export http proxy=http://proxy-businessname.com:8080
    wget--user-agent="Mozilla/5.0 (compatible; MSIE 8.0; Windows NT;Single_Proxy_Simple_Data_Injection_Test)" http://fedeploycheck.fireeye.com/appliance-test/alert.html In examples in which one of security tools 344 is a FireEye data security appliance, such a security tool 344 may detect the test by default, due to the URL being a FireEye-made testing target. In other examples, other URLs may be included so that the test is detected by other security tools 344.

Custom user agents added to these events include simple signatures that allow a variety of security tools 344 to detect the same test traffic. For example, according to aspects of this disclosure, test data 332 may be designed to include one of two user agents. A first user agent may be associated with a proxy IP, while a second user agent may be associated with a load-balanced Virtual IP (VIP) of a data center, as illustrated by the examples below:

Mozilla/5.0 (compatible; MSIE 8.0; Windows NT; Single_Proxy_Simple_Data_Injection_Test);

Mozilla/5.0 (compatible; MSIE 8.0; Windows NT;VIP_Proxy_Simple_Data_Injection_Test)

In the example above, test device 330 may generate test data 332 to include the custom user agent string that is identifiable by security tools 344. The user agent includes a test target (e.g., single_proxy or VIP_proxy) and a test type (e.g., simple). In other examples, the user agent may include additional or different data. For example, the user agent may include one or more time values, symbol strings, hashes, encrypted patterns or the like.

In examples in which one of security tools 344 includes the Security Analytics (also known as NetWitness) or a similar software package, security tool 344 may use an application rule (or "App Rule") to flag test events, so that the test events may be identified and forwarded to security management unit 346. An example application rule is as follows:

FireEye User Agent Checking via Proxies: client contains 'proxy_simple_data_injection_test'

The above rule may be tagged in a meta key called "company.risk" and may be forwarded along to security management unit 346 via a reporter rule on the Security Analytics system. In this example, a Reporter rule that drives a system log (syslog) alert to security management unit 346 simply identifies company.risk='FireEye User Agent Checking via Proxies' and the forwarded data includes the specific user agent involved. In this manner, security management unit 346 and event visualization tool 348 may use the data to identify and differentiate the two test types. In examples in which one of security tools 344 includes the Tipping Point or a similar software package that analyzes web traffic, security tool 344 may use a basic HTTP custom filter that matches the user agent string.

The examples above are intended for purposes of illustration only. That is, test device 330 may generate test data 332 to include any contrived data that is designed not only for security tools 344 to recognize, but also for security tools 344 to understand and process. For example, test data 332 may include multiple time values. In this example, test data 332 may include a time at which test data 332 is injected, a time at which security tools 344 receive test data 332 (e.g., an ingestion time), and/or a time at which test data 332 is realized by security tools 344.

In instances in which security tools 344 have special or advanced features for analyzing data, test device 330 may generate test data 332 to be identified by such special or advanced features. For example, security tools 344 may be configured to recognize symbol strings, hashes, or other patterns. In such an example, test device 330 may generate test data 332 to include symbol strings, hashes, or other patterns to be identified by security tools 344. In still other examples, security tools 344 may be configured to identify target destinations for data transmitted over network 342. In such examples, test device 330 may generate test data 332 to include a particular target destination.

Security management unit 346 receives data from security tools 344, access logs 340 from internet proxy 338, or other sources, and determines whether security tools 344 properly identify and/or process test data 332. For example, security management unit 346 may include a variety of tools or software for verifying that respective security tools 344 identified test data 332 injected by test device 330. Security management unit 346 may also be configured to determine other factors based on the particular data included in test data 332. For example, security management unit 346 may determine a time at which test data 332 was received by respective security tools 344, a time at which test data 332 was processed by respective security tools 344, and whether respective security tools 344 properly identified the content of test data 332 (e.g., such as symbol strings, hashes, encrypted patterns or the like).

In an example for purposes of illustration, test device 330 may be configured to inject test data 332 into the network one time per hour. Security management unit 346 may verify that respective security tools 344 identify that test data 332 one time in per hour. Security management unit 346 may identify a processing delay if a particular one of security tools 344 does not identify test data 332 during one hour, but identifies two instances of test data 332 another hour. In another example, security management unit 346 may identify a processing delay or malfunction by one of security tools 344 identifies test data 332 but another of security tools 344 fails to identify test data 332 or identifies test data 332 at a delayed time relative to one or more other security tools 344.

According to aspects of this disclosure, in some examples, security management unit 346 may also compare data from security tools 344 to one or more other sources of data to verify that test data 332 is properly identified and processed. For example, security management unit 346 may receive access logs 340 from internet proxy 338. The access logs 340 may indicate each instance of service such that each instance of test data 332 is captured in an entry of access logs 340. Security management unit 346 may compare instances in which security tools 344 fail to identify or process test data 332 to access logs 340 in order to verify that security tools 344 were responsible for the failure.

In an example for purposes of illustration, security management unit 346 may determine that security tool 344A did not identify and/or process test data 332 at a particular instance in time. Security management unit 346 may cross check access logs 340 to verify that test data 332 was serviced by internet proxy 338 at the particular instance in time. If test data 332 is included in access logs 340, security management unit 346 may determine that security tool 344A did not identify and/or process test data 332. If, however, test data 332 is not included in access logs 340, security management unit 346 may determine that internet proxy 338 may be down and not operational.

In some examples, security management unit 346 may take a hierarchical approach to determining the effectiveness of security tools 344. For example, security management unit 346 may initially determine whether security tools 344 identify an instance of test data 332. Security management unit 346 may then determine whether security tools 344 identified and/or processed test data 332 in a timely manner, e.g., within an expected time period accounting for inherent network latencies. Security management unit 346 may then determine whether security tools 344 processed test data 332 in an expected manner. For example, security management unit 346 may determine whether security tools 344 processed test data 332 based on the type of data included in test data (e.g., a sandboxing feature of one of security tools 344 was activated based on identification of a particular type of test data 332).

Event visualization tool 348 may generate a report that indicates whether security tools 344 properly identify and/or process test data 332. For example, event visualization tool 348 may generate a variety of tables, graphs, charts, or the like that indicate whether security tools 344 properly identify and/or process test data 332. An example of event visualization tool 348 is Splunk Enterprise developed by Splunk Corporation.

Figure 3B:
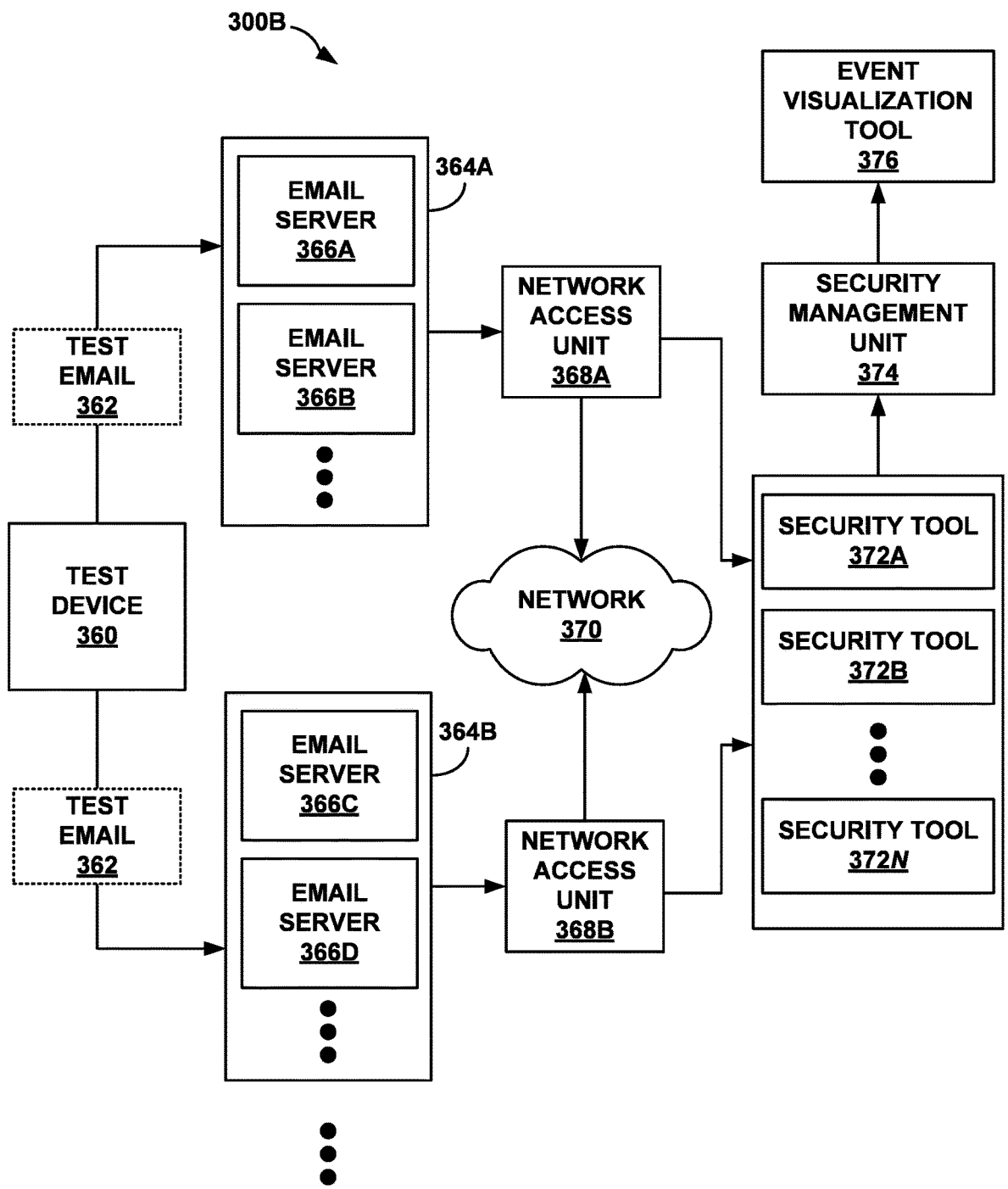
FIG. 3B is a block diagram illustrating another example networked computing system having a test device that is configured to verify system effectiveness in accordance with the techniques of this disclosure.

FIG. 3B is a block diagram illustrating another example networked computing system having a test device that is configured to verify system effectiveness in accordance with the techniques of this disclosure. The example of FIG. 3B includes test device 360, test email 362, data centers 364A and 364B (collectively data centers 364) having respective email servers 366A-366D (collectively, email servers 366), and network access units 368A and 368B for connecting to network 370. FIG. 3B also includes security tools 372A-372N (collectively, security tools 372), a security management unit 374, and an event visualization tool 376. The architecture of the system illustrated in FIG. 3B is shown for exemplary purposes only, and other examples may have additional, fewer, or alternative components than those shown in FIG. 3B.

The example of FIG. 3B generally illustrates the techniques in the context of testing the effectiveness of email security devices or services. In some examples, certain components of FIG. 3B may be configured similarly or the same as components illustrated in the example of FIG. 2A (and/or FIG. 3A). For example, test device 360 may generally correspond to test device 220, test data 62 may generally correspond to test data 222, network access units 368 may generally correspond to network access unit 214, and network 370 may generally correspond to network 16. In addition, security tools 372 may correspond to security tools 344 of FIG. 3A and security management unit 374 and event visualization tool 376 may correspond to security management unit 346 and event visualization tool 348, respectively, of FIG. 3A.

According to aspects of this disclosure, test device 360 may generate test email 362 that includes data of interest, e.g., that security tools 372 are configured to identify as unauthorized and/or malicious data. As described above with respect to the example of FIG. 3A, the data of interest may be any contrived data that is designed for security tools 372 to recognize as well as understand and process. For example, test device 360 may generate test email 362 to include a sender that is to be identified as data of interest. In another example, test device 360 may generate test email 362 to include a symbol string that is to be identified as data of interest by security tools 372. In still another example, test device 360 may generate test email 362 to include an attachment that is to be identified as data of interest by security tools 372.

In an example for purposes of illustration, test device 360 may be configured to generate test email 362 to include a PDF document that is designed as data of interest to be identified by security tools 372. As another example, test device 360 may be configured to generate test email 362 to include content that is identifiable based on a YARA rule enforced by one or more of security tools 372 that specifies a particular file type and/or language (e.g., a Russian Word document).

According to aspects of this disclosure, test device 360 may generate test email 362 for an email test from a command-line driven script called from a chronological job. Test device 360 may construct a subject line that includes the testing source and the Mail Transfer Agent (MTA) target, and attach a test file expected to be detected by one or more of security tools 372. An example script is written in PERL is as follows:

```perl
#!/Apps/nagios/bin/perl
use strict;
use warnings;
use Sys::Hostname;
use Net::SMTP;
use Data::Dumper;
use MIME::Lite;
use PCSIX qw(strftime);
use Nagios::Plugin;
use lib "/Apps/nagios/libexec";
use utils qw(%ERRORS);
my $exit_code = $ERRORS{'OK'};
my $mxcluster = 'mxin.wellsfargo.com';
my $FROM = 'SCDDataInjectionTesting@wellsfargo.com';
my $TO     = 'SCDDataInjectionTesting@wellsfargo.com';
my $origin = hostname( );
my @out= `/usr/bin/host -t mx $mxcluster`;
if ( $? >> 8 ) {
    print "Unable to determine mx hosts for $mxcluster: $!\n";
    exit $ERRORS{"UNKNOWN"};
}
my @mxhosts;
foreach (@out) {
    m/.* (.*)\./;
    push @mxhosts, $1;
}
my $time1 = strftime "%D %T %Z", localtime;
foreach my $host(@mxhosts) {
    foreach my $f(glob "/Apps/nagios/var/smtp_test_files/*")
    {
        (my $a = $f) =~ s{.*/}{ };
        (my $dest = $host) =~ s/.wellsfargo.com//;
        my $msg = MIME::Lite->new(
                From    => $FROM,
                To      => $TO,
                Subject => "wf_data_injection_testing - $origin to $dest",
                Type    => "multipart/mixed",
        ) ;
        $msg->attach(
                Type => 'application/octet-stream',
                Data => "Inject time : $time1"
        );
        $msg->attach(
                Type     => 'application/octet-stream',
                Path     => $f,
                Filename => $a,
                Disposition => 'attachment'
        );
        eval { $msg->send('smtp', $host, Timeout=>5,); };
        if ($@) {
            print "Unable to send mail through $dest: $@\n";
            $exit_code = $ERRORS{"WARNING"};
            last;
        } else {
            print "Sending mail with file $a through $dest\n";
        }
    }
}
exit $exit_code;
```

Test device 360 injects test email 362 into the system by transmitting test email 362 to each of email servers 366 of data centers 364. Email servers 366 respectively process test email 362 and route test email 362 to a particular target destination. Test email 362 is routed through network access units 368 to network 370. Security tools 372 are configured as visibility points for all traffic passing through network access units 368, including test email 362. Hence, security tools 372 are configured to identify test email 362, e.g., as including unauthorized or malicious data.

Security management unit 374 receives data from security tools 372 and determines whether security tools 372 properly identify and/or process test email 362. For example, security management unit 374 may include a variety of tools or software for verifying that respective security tools 372 identified test email 362 injected by test device 360. Security management unit 374 may also be configured to determine other factors based on the particular data included in test email 362. For example, security management unit 374 may determine a time at which test email 362 was received by respective security tools 372 (e.g., an ingestion time), a time at which test email 362 was processed by respective security tools 372, whether respective security tools 372 properly identified the content of test email 362 (e.g., such as data included in the sender field, recipient field or subject field, symbol strings, hashes, encrypted patterns or the like).

As described above with respect to FIG. 3A, test device 360 may be configured to inject test email 362 into the network at a predetermined interval, e.g., one time per hour, two times per hour, or the like. Security management unit 374 may verify that respective security tools 372 identify test email 362 at the predetermined interval. In some examples, security management unit 374 may compare results from respective security tools 372 to identify any security tools 372 that are not operating correctly.

In some examples, security management unit 374 may take a hierarchical approach to determining the effectiveness of security tools 372. For example, security management unit 374 may initially determine whether security tools 372 identify an instance of test email 362. Security management unit 374 may then determine whether security tools 372 identified and/or processed test email 362 in a timely manner, e.g., within an expected time period accounting for inherent network and/or processing latencies. Security management unit 374 may then determine whether security tools 372 processed test email 362 in an expected manner. For example, security management unit 374 may determine whether security tools 372 processed test email 362 based on the type of data included in the email (e.g., a sandboxing feature of one of security tools 372 was activated based on a YARA rule established at the security tool 372).

Event visualization tool 376 may generate a report that indicates whether security tools 372 properly identify and/or process test email 362. For example, event visualization tool 376 may generate a variety of tables, graphs, charts, or the like that indicate whether security tools 372 properly identify and/or process test email 362.

Figure 3C:
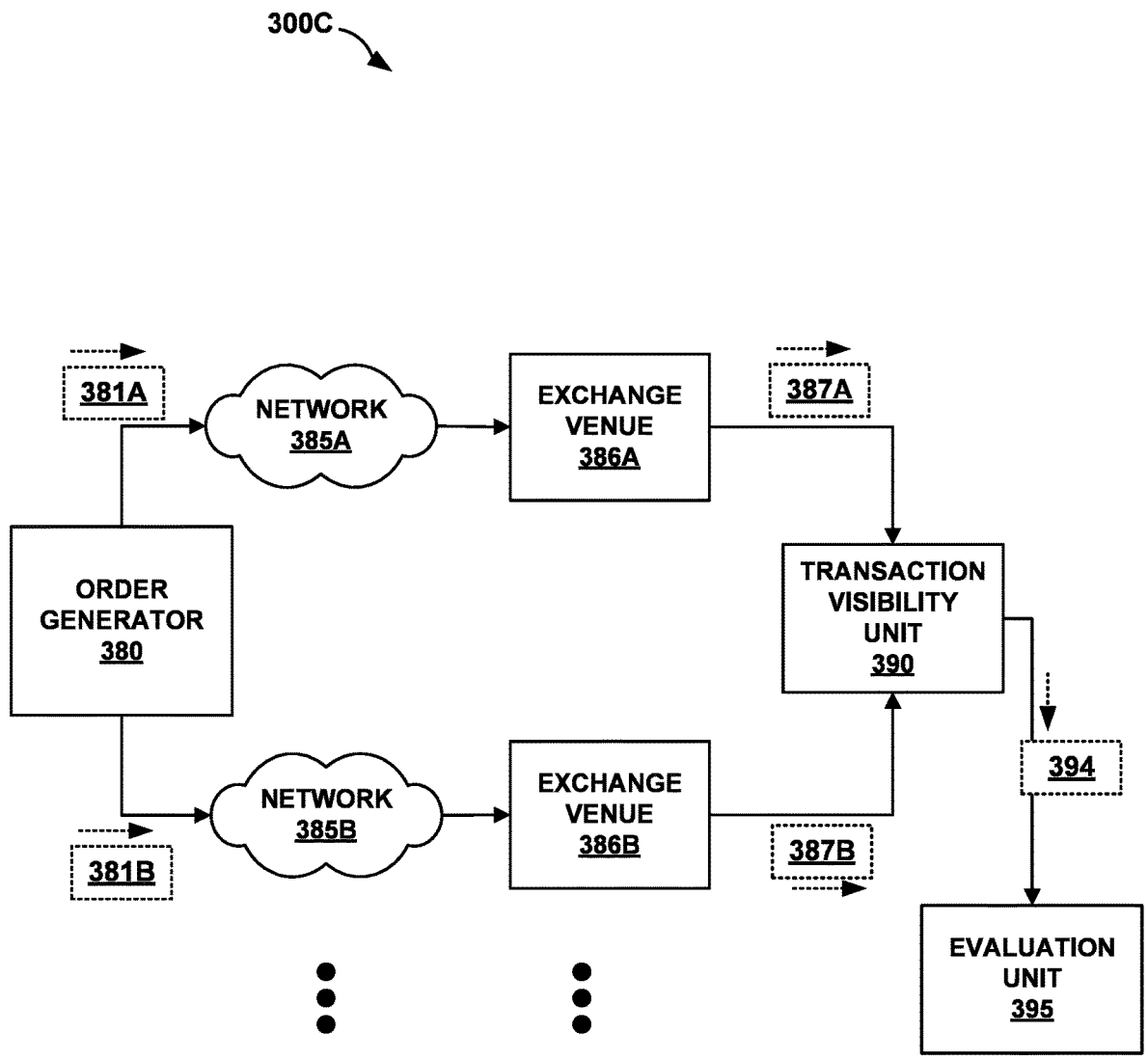
FIG. 3C is a block diagram illustrating another example networked computing system having a test device that is configured to verify system effectiveness in accordance with one or more aspects of the present disclosure.

FIG. 3C is a block diagram illustrating another example networked computing system having a test device that is configured to verify system effectiveness in accordance with one or more aspects of the present disclosure. The example of FIG. 3C illustrates a simplified high-frequency trading system in which trading orders may be submitted by order generator 380 to exchange venue 386A or exchange venue 386B by outputting signals over network 385A and network 385B, respectively. System 300C of FIG. 3C includes multiple networks 385 (e.g. networks 385A and 385B, representing any number of networks) and multiple exchange venues 386 (e.g., exchange venues 386A and 386B, representing any number of exchange venues). Exchange venue 386A generates transaction reporting information 387A, providing information how one or more orders submitted to exchange venue 386A were received, processed, or otherwise handled by exchange venue 386A. Similarly, exchange venue 386B generates transaction reporting information 387B, providing information how one or more orders submitted to exchange venue 386B were received, processed, or otherwise handled by exchange venue 386B. Although only exchange venue 386A and exchange venue 386B are shown in FIG. 3C, other exchange venues 386 may be present, and such exchange venues 386 may also generate transaction reporting information.

In FIG. 3C, each of networks 385 represents a data path from order generator 380 to each of exchange venues 386. Further, each of networks 385 may be viewed as a service path tasked with efficiently submitting orders to each of exchange venues 386. The effectiveness of these service paths (e.g., networks 385), and particularly the timeliness of such service paths, is often critically important for high-frequency trading. Specifically, the effectiveness and profitability of high-frequency trading strategies depends on the timeliness of an order that is generated by order generator 380 and transmitted over each of networks 385 for submission to any of exchange venues 386.

Typically, in a high-frequency trading system, a streamlined hardware infrastructure is deployed within networks 385 to help ensure that no delays along the data path from order generator 380 to any of exchange venues 386 are introduced. Also, it may be difficult to identify causes of delays in processing orders submitted by order generator 380 to exchange venues 386, since in general, very little debugging infrastructure may be present in networks 385 or system 300C. In the system illustrated in FIG. 3C, however, order generator 380 may generate one or more synthetic orders 381A, 381B (collectively, "synthetic orders 381") and submit each of synthetic orders 381 over networks 385 for processing by a respective one of exchange venues 386. Evaluating aspects of how such synthetic orders 381 are processed within system 300C may enable assessment of service paths associated with system 300C and/or networks 385.

Accordingly, in the example of FIG. 3C, each of synthetic orders 381 may represent synthetic, fake, innocuous, and/or test orders that are understood by each of exchange venues 386 to be orders that are not to be acted on. Although not acted on in some examples, each of exchange venues 386 may perform other operations associated with each of synthetic orders 381, such as generating reporting information. Such reporting information may be sufficient to identify timeliness and other information about orders submitted by order generator 380 over each of networks 385. Although in some examples, each of exchange venues 386 may be an actual exchange venue, in other examples, one or more of exchange venues 386 may be a broker, clearing firm, or other market service provider. Each such broker, clearing firm, or other market service provider may treat synthetic orders 381 as orders that are not to be actually submitted to exchange computers responsible for matching buy and sell trade orders to effect market transactions.

Further, in some examples, synthetic orders 381 generated by order generator 380, and whether order generator 380 generates synthetic orders 381, may depend on various market conditions. For instance, in some examples, order generator 380 may generate synthetic orders 381 regularly, causing regular instances of transaction reporting information 387 to be generated (e.g., "pulse reporting"). In other examples, however, it might not be desirable for order generator 380 to generate synthetic orders 381 consistently and/or in situations where such synthetic orders 381 may affect the timeliness of actual orders being submitted ton exchange venues 386. For example, in particular fast-moving market conditions, submission of synthetic orders 381 may have a discernable effect on marketability of one or more actual orders being submitted by order generator 380. Accordingly, in some examples, order generator 380 may refrain from generating synthetic orders 381 during high-volume market conditions, and instead, order generator 380 may tend to generate synthetic orders 381 only during less than high-volume market conditions. In this way, order generator 380 may be able to minimize its effect on live orders being submitted to exchange venues 386, yet still be capable of assessing the effectiveness of the service paths represented by networks 385.

In the example of FIG. 3, and in accordance with one or more aspects of the present disclosure, order generator 380 may generate one or more synthetic transactions. For instance, in an example that can be described with reference to FIG. 3C, order generator 380 generates one or more synthetic orders 381, such as synthetic order 381A and synthetic order 381B. Order generator 380 outputs signals over networks 385A and networks 385B. In general, order generator 380 may generate any number of synthetic orders 381 (e.g., synthetic orders 381A through 381N) to test the speed and suitability of each respective network 385 associated with any of exchange venues 386.

Each of exchange venues 386 may process each respective synthetic order 381. For instance, continuing with the example, each of exchange venues 386 receive, over respective networks 385, signals including information corresponding to synthetic orders 381. Specifically, exchange venue 386A receives information about synthetic order 381A over network 385A and exchange venue 386B receives information about synthetic order 381B over network 385B. Each of exchange venue 386A and exchange venue 386B log information about each respective synthetic order 381, such as the time the order was received and other attributes associated with receipt of synthetic orders 381 or processing of synthetic orders 381.

In addition, one or more of networks 385 may use non-intrusive techniques to monitor data traveling within each of networks 385. In some examples, one or more of networks 385 may use network taps or network spans to capture data corresponding to orders or transactions destined for each of exchange venues 386. Such monitoring may take place at one or more points along the logical trading path associated with each of synthetic orders 381. In some examples, each of exchange venues 386 may perform logging to the extent that such logging can be performed without affecting timeliness of other orders.

Transaction visibility unit 390 may evaluate effectiveness of each of networks 385. For instance, still referring to FIG. 3C, each of exchange venues 386 output transaction reporting information 387A, 387B (collectively, "transaction reporting information 387") to transaction visibility unit 390. Transaction visibility unit 390 generates, based on transaction reporting information 387, transaction reporting information 394. Transaction visibility unit 390 outputs transaction reporting information 394 to evaluation tool 395. Evaluation tool 395 analyzes evaluation tool 395 and determines information about suitability of one or more of networks 385 and/or exchange venues 386 for high-frequency trading.

In some examples, evaluation tool 395 may identify one or more steps that might be taken to improve suitability of one or more of networks 385 and exchange venues 386 for high-frequency trading. For significant delays and/or gaps, evaluation tool 395 may raise alerts or issue notifications, and/or cause migration to alternative service paths if appropriate. In some examples, information about failures and delays identified by monitoring the service path can be used to ensure compliance with service level agreements and/or to prioritize improvements to technology underlying the service path, hardware underlying the service path, or processes employed by the service path.

Figure 4:
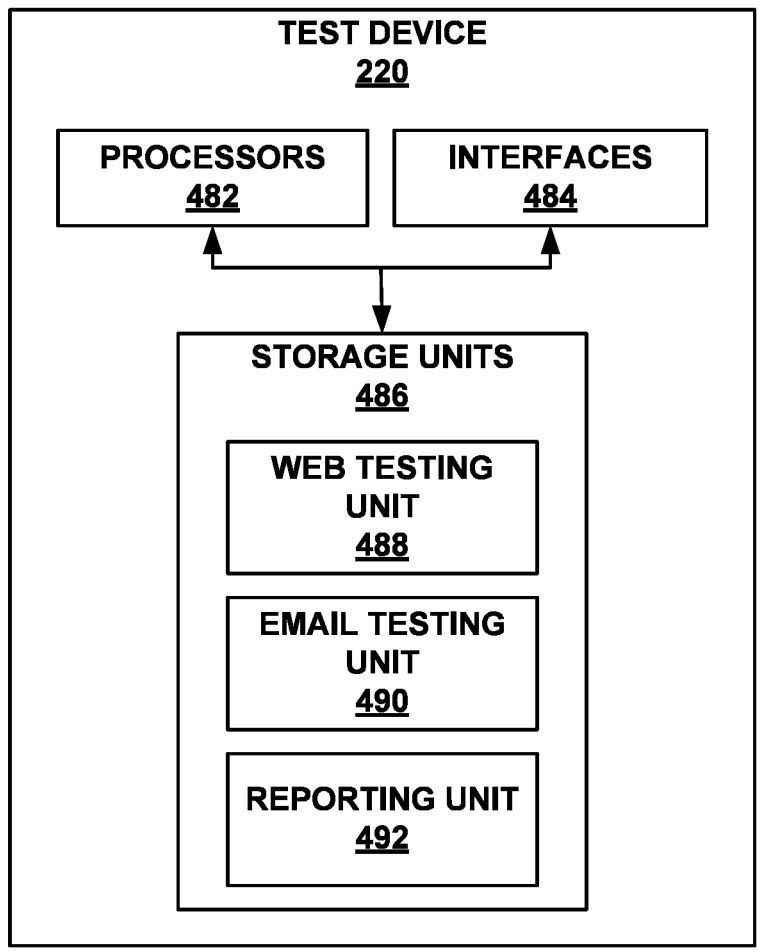
FIG. 4 is a block diagram illustrating several components of a test device in greater detail.

FIG. 4 is a block diagram illustrating several components of test device 220 of FIG. 2A in greater detail. In some instances, test devices 120 (FIG. 1), test system 240, test device 330 (FIG. 3A), test device 360 (FIG. 3B), and/or evaluation unit 395 may also be configured similarly to the example shown in FIG. 4. In the illustrated example, test device 220 includes one or more processors 482, one or more interfaces 484, and one or more storage units 486 storing web testing unit 488, email testing unit 490, and reporting unit 492. The architecture of device 220 illustrated in FIG. 4 is an example. In other examples, test device 220 may be configured in a variety of other ways having additional, fewer, or alternative components than those shown in FIG. 4.

For example, while the example of FIG. 4 illustrates test device 220 as including web testing unit 488, email testing unit 490, and reporting unit 492, in other examples, such components may be distributed among more than one computing device. That is, test device 220 may include web testing unit 488 and/or email testing unit 490 for generating test data, while reporting unit 492 may be included in a separate computing device for generating and/or outputting results data.

Processors 482, in one example, are configured to implement functionality and/or process instructions for execution within test device 220. For example, processors 482 may be capable of processing instructions stored by storage units 486. Processors 482 may include, for example, microprocessors, digital signal processors (DSPs), application specific integrated circuits (ASICs), field-programmable gate array (FPGAs), or equivalent discrete or integrated logic circuitry.

Test device 220 may utilize interfaces 484 to communicate with external devices via one or more wired or wireless connections. Interfaces 484 may be network interfaces cards, universal serial bus (USB) interfaces, optical interfaces, or any other type of interfaces capable of sending and receiving information via TCP/IP. Examples of such network interfaces may include Ethernet, Wi-Fi, or Bluetooth radios.

Storage units 486 may store an operating system (not shown) that controls the operation of components of test device 220. For example, the operating system may facilitate the communication of web testing unit 488, email testing unit 490, and reporting unit 492 with processors 482 and interfaces 484. In some examples, storage units 486 are used to store program instructions for execution by processors 482, such as web testing unit 488, email testing unit 490, and reporting unit 492. Storage units 486 may also be configured to store information within test device 220 during operation. Storage units 486 may be used by software or applications (e.g., web testing unit 488, email testing unit 490, and reporting unit 492) executed by processors 482 of test device 220 to temporarily store information during program execution.

Storage units 486 may include a computer-readable storage medium or computer-readable storage device. In some examples, storage units 486 include one or more of a short-term memory or a long-term memory. Storage units 486 may include, for example, random access memories (RAM), dynamic random access memories (DRAM), static random access memories (SRAM), magnetic hard discs, optical discs, flash memories, or forms of electrically programmable memories (EPROM) or electrically erasable and programmable memories (EEPROM).

According to aspects of this disclosure, web testing unit 488, email testing unit 490, and reporting unit 492 may be configured to perform the techniques described herein. For example, web testing unit 488 may be configured to generate test data 332 described with respect to the example system of FIG. 3A. Email testing unit 490 may be configured to generate test email 362 described with respect to the example system of FIG. 3B. Although not illustrated in FIG. 4, one or more other modules may also be included in FIG. 4 and configured to generate test data or events for use in FIG. 3C, or in connection with FIGS. 1, 2A, and 2B. Reporting unit 492 may be configured to generate and output results data, e.g., as described with respect to security management unit 346 and event visualization tool 348 of FIG. 3A, security management unit 374 and event visualization tool 376 of FIG. 3B, and transaction visibility unit 390 and evaluation unit 395 of FIG. 3C. That is, reporting unit 492 may be configured to determine whether test data is identified at one or more visibility points as data of interest, and/or output data that indicates whether test data is identified at the one or more visibility points as data of interest.

Figures 5A, 5B:
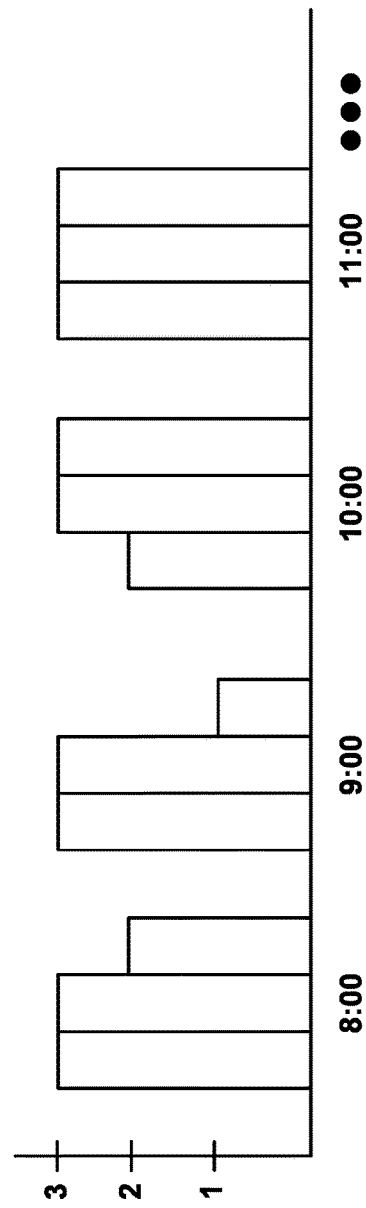
FIG. 5A and FIG. 5B generally illustrate a visual representation of results data, e.g., data that indicates whether test data is identified at one or more visibility points as data of interest.

FIG. 5A and FIG. 5B generally illustrate a visual representation of results data, e.g., data that indicates whether test data is identified at one or more visibility points as data of interest. In some examples, the representations shown in FIGS. 5A and 5B may be generated by security management unit 346 and event visualization tool 348 of FIG. 3A or security management unit 374 and event visualization tool 376 of FIG. 3B.

For example, FIG. 5A is a table illustrating whether test data has been properly identified in accordance with the techniques of this disclosure. In the illustrated example, each of locations A-C has a number of web proxies that service network routes. For example, location A has 8 associated web proxies, location B has 6 associated web proxies, and location C has 9 associated web proxies.

Hence, FIG. 5A generally illustrates whether test data is identified by each network route each hour at each of locations A-C. There are a number of hours in which the test data is correctly identified by security tools of the network. However, during time period 101, each of the locations includes at least one instance in which a security tool failed to properly identify test data on at least one network route. The failures may be associated with a variety of causes. For example, a particular security tool may experience feed saturation in which more data is being routed to the security tool than the security tool is able to service. As another example, a particular security tool may experience processing saturation in which the security tool has too much processing work to be done at a specific time. In still other examples, proxies may fail such that a security tool is not being provided with test data. A system administrator may use the data shown in FIG. 5A to identify locations having performance issues to identify and correct the errors.

FIG. 5B is a bar chart illustrating whether email test data has been properly identified in accordance with the techniques of this disclosure. For example, FIG. 5B illustrates a computing system having three network routes (one route corresponds to one bar) for routing email traffic that are each tested three times per hour (three instances of test emails being injected into the network every hour). In the example of FIG. 5B, at least one security tool fails to identify test data (e.g., test emails) at each of 8:00, 9:00, and 10:00. Again, a system administrator may use the data shown in FIG. 5B to identify locations having performance issues to identify and correct the errors.

Figure 6:
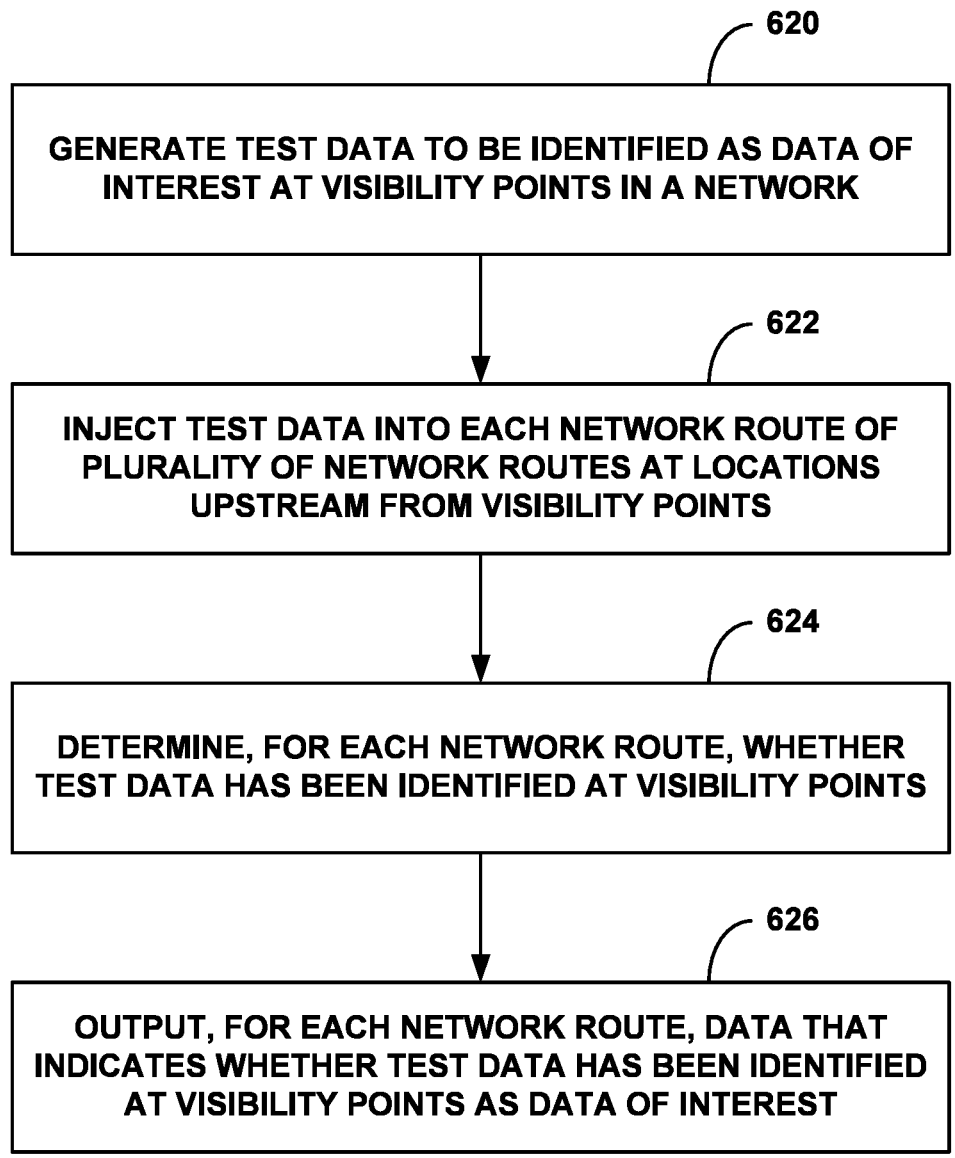
FIG. 6 is a flow chart illustrating a process for testing system effectiveness, in accordance with the techniques of this disclosure.

FIG. 6 is a flow chart illustrating a process for testing system effectiveness, in accordance with the techniques of this disclosure. The techniques described with respect to the example of FIG. 6 may be carried out by a variety of computing systems, such as those described with respect to FIGS. 1, 2A-2B, and 3A-3C.

In the illustrated example, a computing device generates test data configured to be identified as data of interest at visibility points in a network or along a service path (620). For example, the test data may include any data that is identifiable as data of interest by the visibility points of a computing system. The test data may be referred to as "innocuous data," in that the test data is not intended to carry out any function other than testing how effectively data is identified and/or processed by components of the system. The specific configuration of the test data may depend on the particular system effectiveness being tested. That is, the test data may be meaningful in that the test data may measure whether particular functions of the visibility points are operational. The computing device then injects the test data into each network route of a plurality of network routes at locations upstream from the visibility points in the network or along a service path (622).

The computing device determines, for each network route, whether the test data has been identified at the visibility points (624). For example, the computing device (or another management or reporting tool) may obtain, from each of the visibility points, results data that indicates whether respective visibility points have identified the test data. In some examples, the computing device may also obtain other data from the visibility points, such as data indicating a time at which the test data is processed, the manner in which the visibility points identified the test data (e.g., how the visibility points categorized the test data), and/or the manner in which the visibility points process the test data (e.g., what processes the visibility points apply to the test data).

The computing device outputs, for each network route, data that indicates whether the test data has been identified at the visibility points as data of interest (626). For example, the computing device may output data indicating that one or more the visibility points did not identify the test data or improperly categorized or processed the test data.

Figure 7:
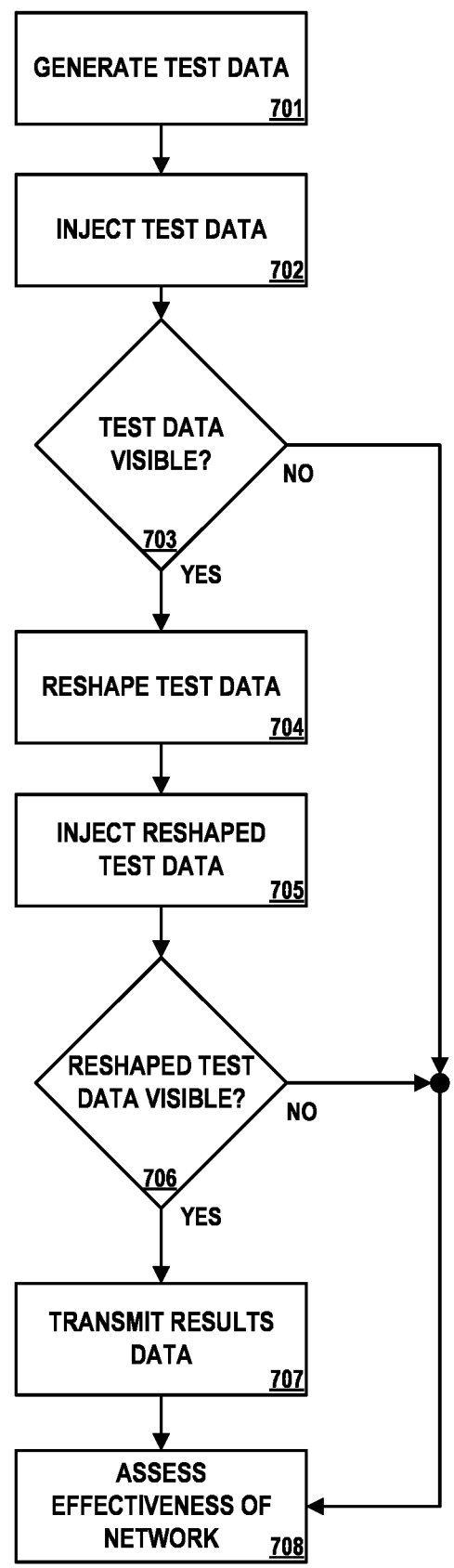
FIG. 7 is a flow chart illustrating operations performed by an example system in accordance with one or more aspects of the present disclosure.

FIG. 7 is a flow diagram illustrating operations performed by an example system in accordance with one or more aspects of the present disclosure. FIG. 7 is described below within the context of test device 220 and visibility points 218 of FIG. 2A. In other examples, operations described in FIG. 7 may be performed by one or more other components, modules, systems, or devices. Further, in other examples, operations described in connection with FIG. 7 may be merged, performed in a difference sequence, omitted, or may encompass additional operations not specifically illustrated or described.

In the process illustrated in FIG. 7, and in accordance with one or more aspects of the present disclosure, test device 220 may generate test data (701). For instance, in some examples, and with reference to FIG. 2A, test device 220 generates data that is configured to be identified as data of interest within network 216. In some examples, such data may be innocuous data that has attributes of malicious or unauthorized data, but is not intended to carry out any function despite such attributes. In some examples, such data may appear to have attributes of a known virus, or may be an email that has an attachment that has attributes of a known malicious file or malware. Test device 220 uses such data to generate test data 222.

Test device 220 may inject test data (702). For instance, in some examples, test device 220 may output test data 222 to network access unit 214. Network access unit 214 causes test data 222 to be transmitted on one or more network routes 217 associated with network 216.

One or more of visibility points 218 may determine whether test data 222 is visible (703). For instance, in some examples, one or more of visibility points 218 monitor data within network 216 and/or along network routes 217. In one such example, visibility point 218A detects test data 222 and recognizes test data 222 as data of interest.

One or more of visibility points 218 may reshape test data 222 (704 and YES path from 703). For instance, some examples, visibility point 218A evaluates test data 222 and identifies one or more remedial, corrective, and/or protective actions to perform on test data 222. Visibility point 218A performs the action(s) and generates reshaped or modified test data 223. To generate modified test data 223, visibility point 218A may remove a file from an email, modify a header in a network packet, modify other data, or otherwise reshape test data 222. In other examples, visibility point 218A may block test data 222, thereby removing test data 222 from network 216 and one or more network routes 217.

One or more of visibility points 218 may inject reshaped test data (705). For instance, in the example being described, visibility point 218A injects modified test data 223 into network 216 by transmitting modified test data 223 along one or more of network routes 217.

One or more of visibility points 218 may determine whether the reshaped test data is visible (706). For instance, visibility point 218B, which may be downstream from visibility point 218A, monitors data within network 216 and/or along network routes 217. Visibility point 218 detects modified test data 223 and recognizes modified test data 223 as data of interest.

One or more of visibility points 218 may transmit results data (707 and YES path from 706). For instance, visibility point 218A may transmit results data 224 indicating whether test data 222 was visible at visibility point 218. Visibility point 218B may transmit results data 224 indicating whether modified test data 223 was visible at visibility point 218.

Test device 220 may assess the effectiveness of network 216 (708 and NO paths from 703, 706). For instance, in the example described above, test device 220 receives results data 224 from each of visibility point 218A and visibility point 218B. Test device 220 evaluates results data 224 and determines whether test data 222 and modified test data 223 were visible within network 216 and along network routes 217 at appropriate times. Based on such an evaluation, test device 220 may assess whether network 216 is operating properly, as expected, and/or in a timely manner. In some examples, one or more of visibility points 218 may fail to identify test data 222 (NO path from 703) or modified test data 223 (NO path from 706). In such examples, test device 220 may evaluate the effectiveness of network 216 based on such failures.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over a computer-readable medium as one or more instructions or code, and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry, as well as any combination of such components. Accordingly, the term "processor," as used herein may refer to any of the foregoing structures or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a microprocessor, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

What is claimed is:

1. A system comprising:
   a plurality of process devices configured to perform physical operations;
   a service orchestrator configured to control operation of one or more of the process devices; and
   a test system including a plurality of visibility point devices configured to monitor one or more of the physical operations performed by one or more of the process devices, wherein the test system is configured to:
   output a control signal to the service orchestrator to direct one or more of the plurality of process devices to perform a test physical operation involving a physical item,
   monitor performance of physical operations performed by one or more of the process devices,
   determine, by a first visibility point in the plurality of visibility point devices, whether one or more of the plurality of process devices performed the test physical operation involving the physical item,
   output a shaping control signal to the service orchestrator to direct one or more of the plurality of process devices to perform a test shaping operation involving the physical item,
   determine, by a second visibility point in the plurality of visibility point devices, whether one or more of the plurality of process devices performed the test shaping operation involving the physical item, and
   assess effectiveness of the process devices based on whether one or more of the plurality of process devices performed the test physical operation involving the physical item and whether one or more of the plurality of process devices performed the test shaping operation involving the physical item.

2. The system of claim 1, wherein to output the control signal, the test system is further configured to:
   output a control signal to direct one or more of the plurality of process devices to create the physical item.

3. The system of claim 1, wherein to output the control signal, the test system is further configured to:
   output a control signal to direct one or more of the plurality of process devices to modify the physical item.

4. The system of claim 1, wherein to monitor performance of physical operations performed by the one or more of the process devices, the test system is further configured to:
   monitor timeliness of physical operations performed by the one or more of the process devices.

5. The system of claim 1, wherein to determine whether one or more of the plurality of process devices performed the test physical operation involving the physical item, the test system is further configured to:
   evaluate whether the physical item was created.

6. The system of claim 5, wherein to determine whether one or more of the plurality of process devices performed the test physical operation involving the physical item, the test system is further configured to:
   evaluate attributes of the physical item, including a physical appearance of the physical item.

7. The system of claim 1, wherein to output the shaping control signal, the test system is further configured to:
   output a control signal to direct one or more of the plurality of process devices to modify the physical item.

8. The system of claim 7, wherein to determine whether one or more of the plurality of process devices performed the test shaping operation involving the physical item, the test system is further configured to:
   evaluate whether the physical item was modified.

9. The system of claim 7, wherein to determine whether one or more of the plurality of process devices performed the test shaping operation involving the physical item, the test system is further configured to:
   evaluate attributes of the physical item, including whether appropriate text was applied to the physical item.

10. The system of claim 9, wherein to evaluate attributes of the physical item, the test system is further configured to:
    receive an indication of user input; and
    evaluate attributes of the physical item based on the indication of input.

11. The system of claim 1, wherein assessing the effectiveness of the system includes:
    evaluating timeliness of physical operations performed by one or more of the process devices.

12. The system of claim 1, wherein assessing the effectiveness of the system includes:
    evaluating an image the physical item.

13. The system of claim 1, wherein the test system is further configured to:
    determine that one or more of the plurality of process devices did not perform the test shaping operation;
    suspend at least some operations of the plurality of process devices; and
    initiate a repair and resume protocol.

14. The system of claim 13, wherein to initiate a repair and resume protocol, the test system is further configured to:
    output a control signal to adjust timeliness associated with the one or more process devices performing the test shaping operation.

15. The system of claim 14, wherein to output the control signal to adjust timeliness, the test system is further configured to:
    tune the timeliness associated with one or more of the process devices.

16. A method comprising:
    outputting, by a test system, a control signal to one or more of a plurality of process devices to perform a test physical operation involving a physical item;
    monitoring, by the test system, performance of physical operations performed by one or more of the process devices;
    determining, by a first visibility point device included within the test system, whether one or more of the plurality of process devices performed the test physical operation involving the physical item;
    outputting, by the test system, a shaping control signal to direct one or more of the plurality of process devices to perform a test shaping operation involving the physical item;
    determining, by a second visibility point device included within the test system, whether one or more of the plurality of process devices performed the test shaping operation involving the physical item; and
    assessing, by the test system, effectiveness of the process devices based on whether one or more of the plurality of process devices performed the test physical operation involving the physical item and whether one or more of the plurality of process devices performed the test shaping operation involving the physical item.

17. The method of claim 16, wherein outputting the control signal includes:
    outputting a control signal to direct one or more of the plurality of process devices to create the physical item.

18. The method of claim 16, wherein outputting the control signal includes:

outputting a control signal to direct one or more of the plurality of process devices to modify the physical item.

19. The method of claim 16, wherein monitoring performance of physical operations performed by the one or more of the process devices includes:

monitoring timeliness of physical operations performed by the one or more of the process devices.

20. A non-transitory computer-readable medium comprising instructions that, when executed, configure processing circuitry of a test system to:

output a control signal to one or more of a plurality of process devices to perform a test physical operation involving a physical item;

monitor performance of physical operations performed by one or more of the process devices;

determine, by a first visibility point device included within the test system, whether one or more of the plurality of process devices performed the test physical operation involving the physical item;

output a shaping control signal to direct one or more of the plurality of process devices to perform a test shaping operation involving the physical item;

determine, by a second visibility point device included within the test system, whether one or more of the plurality of process devices performed the test shaping operation involving the physical item; and assess effectiveness of the process devices based on whether one or more of the plurality of process devices performed the test physical operation involving the physical item and whether one or more of the plurality of process devices performed the test shaping operation involving the physical item.

* * * * *